(12) United States Patent
Li et al.

(10) Patent No.: US 11,735,168 B2
(45) Date of Patent: Aug. 22, 2023

(54) METHOD AND APPARATUS FOR RECOGNIZING VOICE

(71) Applicant: BEIJING BAIDU NETCOM SCIENCE AND TECHNOLOGY CO., LTD., Beijing (CN)

(72) Inventors: Xin Li, Beijing (CN); Bin Huang, Beijing (CN); Ce Zhang, Beijing (CN); Jinfeng Bai, Beijing (CN); Lei Jia, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 71 days.

(21) Appl. No.: 17/209,681

(22) Filed: Mar. 23, 2021

(65) Prior Publication Data
US 2021/0233518 A1 Jul. 29, 2021

(30) Foreign Application Priority Data

Jul. 20, 2020 (CN) .......................... 202010697077.4

(51) Int. Cl.
*G10L 15/16* (2006.01)
*G06N 3/08* (2023.01)
(Continued)

(52) U.S. Cl.
CPC ............... *G10L 15/16* (2013.01); *G06N 3/08* (2013.01); *G10L 15/063* (2013.01);
(Continued)

(58) Field of Classification Search
CPC ..... G10L 15/16; G10L 15/063; G10L 15/197; G10L 15/22; G10L 15/32; G10L 25/18; G10L 15/20; G10L 2015/0631; G06N 3/08
See application file for complete search history.

(56) References Cited

U.S. PATENT DOCUMENTS 10,224,058 B2 3/2019 Variani et al.
10,930,299 B2* 2/2021 Lu ........................... G10L 25/18
(Continued)

FOREIGN PATENT DOCUMENTS

CN 101807399 A 8/2010
CN 108647556 A 10/2018
(Continued)

OTHER PUBLICATIONS

European Patent Application No. 211750492, extended European search report dated Nov. 9, 2021, 33 pages.

*Primary Examiner* — Bhavesh M Mehta
*Assistant Examiner* — Edward Tracy, Jr.
(74) *Attorney, Agent, or Firm* — Cozen O'Connor

(57) ABSTRACT

A method and an apparatus for recognizing a voice are provided. The method may include: inputting a target voice into a pre-trained voice recognition model to obtain an initial text output by at least one recognition network in the voice recognition model, the recognition network including a plurality of preset types of processing layers, and at least one type of processing layer of the recognition network being obtained by training based on a voice sample in a preset direction interval; and determining a voice recognition result of the target voice, based on the initial text.

21 Claims, 9 Drawing Sheets

(51) Int. Cl.
*G10L 15/06* (2013.01)
*G10L 15/197* (2013.01)
*G10L 15/22* (2006.01)
*G10L 15/32* (2013.01)
*G10L 25/18* (2013.01)
*G10L 15/20* (2006.01)

(52) U.S. Cl.
CPC ............ *G10L 15/197* (2013.01); *G10L 15/22* (2013.01); *G10L 15/32* (2013.01); *G10L 25/18* (2013.01); *G10L 15/20* (2013.01); *G10L 2015/0631* (2013.01)

(56) References Cited

U.S. PATENT DOCUMENTS

| | | | | |
|---|---|---|---|---|
| 2012/0183149 A1* | 7/2012 | Hiroe | ........................ | G10L 25/48 381/56 |
| 2015/0095026 A1 | 4/2015 | Bisani et al. | | |
| 2016/0322055 A1 | 11/2016 | Sainath et al. | | |
| 2019/0095430 A1* | 3/2019 | Smus | ........................ | G06F 40/58 |
| 2019/0164552 A1* | 5/2019 | Lim | ........................ | G06F 3/0488 |
| 2019/0306620 A1 | 10/2019 | Hayashida et al. | | |
| 2020/0219486 A1* | 7/2020 | Fu | ........................ | G06F 3/167 |
| 2020/0312350 A1 | 10/2020 | Lim et al. | | |

FOREIGN PATENT DOCUMENTS

| | | |
|---|---|---|
| CN | 109147787 A | 1/2019 |
| CN | 109308909 A | 2/2019 |
| CN | 109523994 A | 3/2019 |
| CN | 109785824 A | 5/2019 |
| CN | 109830245 A | 5/2019 |
| CN | 110164446 A | 8/2019 |
| CN | 110517705 A | 11/2019 |
| CN | 110794368 A | 2/2020 |
| CN | 110992974 A | 4/2020 |
| CN | 111241891 A | 6/2020 |
| JP | 2016536626 A | 11/2016 |
| WO | WO 2020/001163 A | 1/2020 |

* cited by examiner

Voice recognition result
↑
Streaming multi-layer truncated attention (SMLTA) layer
↑
Long short-term memory (LSTM) network layer
↑
Low frame rate feature extraction layer
↑
Layer for converting a complex number to a real number
↑
Complex linear transformation layer
↑
Complex bias layer
↑
Complex convolutional layer
↑
Fourier transform network
↑
Target voice

Fig. 3a

METHOD AND APPARATUS FOR RECOGNIZING VOICE

CROSS-REFERENCE TO RELATED APPLICATIONS

This application claims the priority of Chinese Patent Application No. 202010697077.4, entitled "METHOD, APPARATUS FOR RECOGNIZING VOICE", filed on Jul. 20, 2020, the content of which is incorporated herein by reference in its entirety.

TECHNICAL FIELD

Embodiments of the present disclosure relate to the field of computer technology, particularly to the field of voice and deep learning technology, and more particularly to a method and apparatus for recognizing a voice.

BACKGROUND

Voice recognition refers to the technology of converting voice signals into text. Recently, with the development of voice recognition technology, the accuracy of voice recognition has been greatly improved. At present, the voice recognition technology has been widely used in scenarios such as smart home, in-vehicle voice, and smart office. The accuracy of voice recognition directly affects user experience of related products.

At present, the voice recognition technology performs well under high SNR (signal-noise ratio) scenarios, but its performance is unstable under low SNR scenarios. Far-field voice recognition is a typical low SNR scenario. In a far-field environment, a target sound source is far away from a pickup, causing serious attenuation of a target signal. In addition, the environment is noisy and there are many interference signals, which ultimately leads to a low SNR and poor voice recognition accuracy.

SUMMARY

A method, apparatus, electronic device and storage medium for recognizing a voice are provided.

According to a first aspect, there is provided a method for recognizing a voice, including: inputting a target voice into a pre-trained voice recognition model to obtain an initial text output by at least one recognition network in the voice recognition model, the recognition network comprising a plurality of preset types of processing layers, and at least one type of processing layer of the recognition network being obtained by training based on a voice sample in a preset direction interval; and determining a voice recognition result of the target voice, based on the initial text.

According to a second aspect, a method for training a voice recognition model is provided, including: acquiring a training sample, a voice sample for training in the training sample comprising a voice sample in a preset direction interval; inputting the voice sample for training into a to-be-trained voice recognition model to obtain an initial text output by at least one recognition network in the voice recognition model, the recognition network comprising a plurality of preset types of processing layers; and training the voice recognition model to obtain a trained voice recognition model, based on the initial text.

According to a third aspect, an apparatus for recognizing a voice is provided, including: a prediction unit, configured to input a target voice into a pre-trained voice recognition model to obtain an initial text output by at least one recognition network in the voice recognition model, the recognition network comprising a plurality of preset types of processing layers, and at least one type of processing layer of the recognition network being obtained by training based on a voice sample in a preset direction interval; and a determination unit, configured to determine a voice recognition result of the target voice, based on the initial text.

According to a fourth aspect, there is provided an apparatus for training a voice recognition model, including: an acquisition unit, configured to acquire a training sample, a voice sample for training in the training sample comprising a voice sample in a preset direction interval; an input unit, configured to input the voice sample for training into a to-be-trained voice recognition model to obtain an initial text output by at least one recognition network in the voice recognition model, the recognition network comprising a plurality of preset types of processing layers; and a training unit, configured to train the voice recognition model to obtain a trained voice recognition model, based on the initial text.

According to a fifth aspect, there is provided an electronic device, including: one or more processors; a storage device, for storing one or more programs, where when one or more programs are executed by one or more processors, one or more processors implement the method of any one of embodiments of the method for recognizing a voice or the method for training a voice recognition model.

According to a sixth aspect, there is provided a computer-readable storage medium having a computer program stored thereon, which, when executed by a processor, implements the method of any one of embodiments of the method for recognizing a voice or the method for training a voice recognition model.

BRIEF DESCRIPTION OF THE DRAWINGS

By reading the detailed description of non-limiting embodiments with reference to the following accompanying drawings, other features, objectives and advantages of the present disclosure will become more apparent:

FIG. 3a is a flowchart of performing voice recognition based on a first voice recognition model of the method for recognizing a voice of the present disclosure;

DETAILED DESCRIPTION OF EMBODIMENTS

The following describes example embodiments of the present disclosure with reference to the accompanying drawings, which include various details of the embodiments of the present disclosure to facilitate understanding, and should be regarded as merely example. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
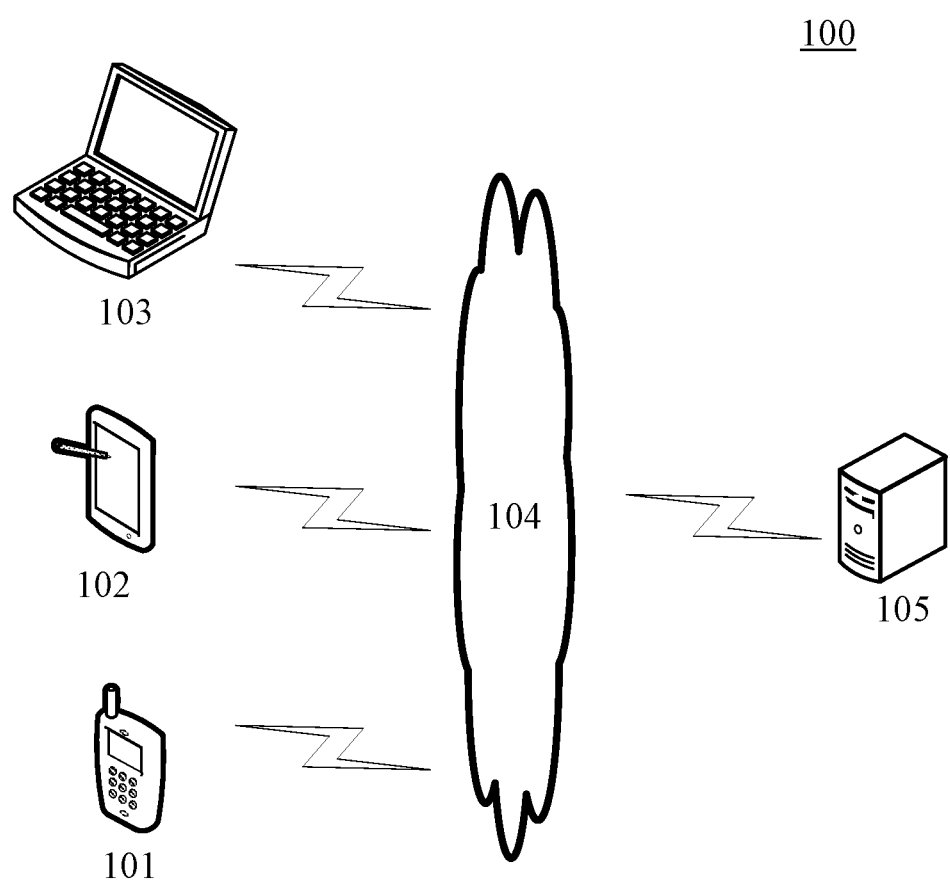
FIG. 1 is an example system architecture diagram in which some embodiments of the present disclosure may be implemented.

FIG. 1 illustrates an example system architecture 100 of an embodiment of a method for recognizing a voice or an apparatus for recognizing a voice in which the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal devices 101, 102 and 103 to receive or send messages and the like. Various communication client applications may be installed on the terminal devices 101, 102, 103, such as voice recognition applications, live applications, instant messaging tools, email clients, or social platform software.

The terminal devices 101, 102, 103 may be hardware or software. When the terminal devices 101, 102, 103 are hardware, they may be various electronic devices having a display screen, including but not limited to smart phones, tablet computers, E-book readers, laptop portable computers, desktop computers, or the like. When the terminal devices 101, 102, 103 are software, they may be installed in the electronic devices listed above. The software may be implemented as, for example, multiple software pieces or software modules (for example, multiple software pieces or software modules for providing distributed services), or as a single software piece or software module, which is not specifically limited herein.

The server 105 may be a server that provides various services, for example, a backend server that provides support for the terminal devices 101, 102, and 103. The backend server may process such as analyze a received target voice and other data, and feed back a processing result (for example, a voice recognition result) to the terminal devices.

It should be noted that the method for recognizing a voice provided by the embodiments of the present disclosure may be performed by the server 105 or the terminal devices 101, 102 and 103, and accordingly, the apparatus for recognizing a voice may be provided in the server 105 or the terminal devices 101, 102 and 103.

It should be understood that the number of terminal devices, networks, and servers in FIG. 1 is merely illustrative. Depending on the implementation needs, there may be any number of terminal devices, networks, and servers.

Figure 2:
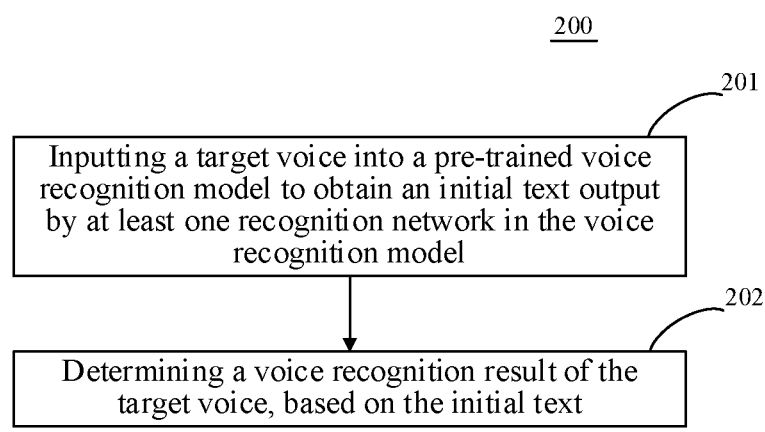
FIG. 2 is a flowchart of an embodiment of a method for recognizing a voice according to the present disclosure.

With further reference to FIG. 2, a flow 200 of an embodiment of a method for recognizing a voice according to the present disclosure is illustrated. The method for recognizing a voice includes the following steps 201 and 202.

Step 201 includes inputting a target voice into a pre-trained voice recognition model to obtain an initial text output by at least one recognition network in the voice recognition model, the recognition network including multiple preset types of processing layers, and at least one type of processing layer of the recognition network being obtained by training based on a voice sample in a preset direction interval.

In the present embodiment, an executing body (for example, the server or terminal devices shown in FIG. 1) on which the method for recognizing a voice is implemented may input the target voice into the pre-trained voice recognition model, and use the at least one recognition network in the voice recognition model to perform voice recognition, so as to obtain a text output by each recognition network in the at least one recognition network, and use the text as the initial text. In practice, there may be different types of processing layers in the multiple processing layers of the recognition network. For example, one type of processing layer may be at least one convolutional layer such as complex convolutional layer, and the other processing layer may be a bias layer such as a complex bias layer. It should be noted that multiple in the present disclosure refers to at least two.

The recognition network may include preset multiple types of processing layers. In practice, the multiple types of processing layers may include a complex convolutional layer (complex conv2d), a complex bias layer (complex bias), a complex linear transformation layer (complex linear), a layer for conversion between a complex number and a real number, a low frame rate feature extraction layer (such as network structure Mobile Net designed for mobile terminals), a long short-term memory (LSTM) network layer, and a streaming multi-layer truncated attention (SMLTA) layer. Alternatively, before the complex convolutional layer, a Fourier transform layer may further be included. Each type of processing layer here may include one or at least two processing layers.

The above direction interval is a direction of arrival (DOA) interval. In practice, the direction interval may be one direction interval. In addition, the preset direction interval may alternatively be multiple direction intervals. For example, if there are multiple recognition networks in the at least one recognition network in the voice recognition model, each recognition network in the multiple recognition networks may be obtained based on voice training in a given direction interval. For the multiple recognition networks, direction intervals corresponding to any two recognition networks may be different. The direction of arrival here may refer to the direction of a sound source.

Step 202 includes determining a voice recognition result of the target voice, based on the initial text.

In the present embodiment, the executing body may determine the voice recognition result of the target voice, based on the initial text output by each recognition network in the at least one recognition network. The voice recognition result here is a text corresponding to the target voice. In practice, the text may be completely consistent with a true text corresponding to the target voice, or may deviate from the true text.

Specifically, the voice recognition result may be obtained by using the voice recognition model, that is, the voice recognition result is an output of the voice recognition model. In addition, the voice recognition result may not be a result obtained by the voice recognition model. For example, a prediction result of the voice recognition model may be the initial text, and the executing body may determine the voice recognition result based on the initial text.

In practice, the executing body may use various methods to determine the voice recognition result of the target voice. For example, the executing body may input the initial text into a preset formula or a preset model, and obtain a voice recognition result output by the preset formula or the preset model.

In the voice recognition model used in the method provided by the above embodiment of the present disclosure, at least part of the processing layers of each recognition network is obtained based on voice training in a preset direction interval, thereby improving the accuracy of voice recognition in the preset direction interval.

In some alternative implementations of the present embodiment, in response to the voice recognition model being a first voice recognition model, the at least one recognition network is one recognition network.

In these alternative implementations, if the voice recognition model is the first voice recognition model, the number of recognition network in the at least one recognition network may be one. The processing layers in the recognition network may be obtained by training based on a voice sample in one preset direction interval. These implementations may realize accurate recognition of voice in one preset direction interval.

In some alternative application scenarios of these implementations, step 201 may include: inputting the target voice into a pre-trained first voice recognition model, and performing Fourier transform on the target voice using a Fourier transform network to obtain a transformed voice; predicting a text corresponding to the transformed voice using one recognition network to obtain the initial text; and step 202 may include: determining the initial text as the voice recognition result of the target voice.

In these alternative implementations, the executing body may use one recognition network included in the voice recognition model to predict the text corresponding to the target voice, that is, perform voice recognition on the target voice, so as to obtain the text predicted by the recognition network. The executing body may use the Fourier transform (such as a Fast Fourier Transform, FFT) network to perform Fourier transform on the target voice. In addition, the executing body may use the text predicted by the recognition network as the initial text. Then, the executing body may directly determine the initial text as the voice recognition result of the target voice.

These implementations may use one recognition network trained based on voice in a preset direction interval to perform voice recognition, thereby significantly improving the recognition accuracy for voice in the direction interval.

With further reference to FIG. 3a, illustrating a process of performing voice recognition on a target voice using a first voice recognition model with a single-kind recognition network.

In some alternative implementations of the present embodiment, in response to the voice recognition model being a second voice recognition model, the at least one recognition network is multiple recognition networks; and the multiple recognition networks respectively correspond to multiple preset direction intervals.

In these alternative implementations, if the voice recognition model is the second voice recognition model, there may be multiple recognition networks in the at least one recognition network. The multiple recognition networks respectively correspond to multiple preset direction intervals, that is, in the multiple recognition networks, direction intervals corresponding to every two recognition networks are different. In practice, directions included in the multiple direction intervals may be all directions, that is, 360°. For example, all directions include 360°, and if each direction interval includes 120°, the multiple direction intervals may include 3 direction intervals. If each direction interval includes 36°, the multiple direction intervals may include 10 direction intervals. If each direction interval includes 30°, the multiple of direction intervals may include 12 direction intervals.

In these implementations, the recognition networks may accurately recognize the voice in the multiple preset direction intervals.

In some alternative application scenarios of these implementations, the second voice recognition model further includes a Fourier transform network; the step 201 may include: inputting the target voice into a pre-trained second voice recognition model, and performing Fourier transform on the target voice using the Fourier transform network to obtain a transformed voice; and inputting the transformed voice into each of the multiple recognition networks to obtain the initial text output by each recognition network.

In these alternative application scenarios, the executing body may first perform Fourier transform on the target voice using the Fourier transform network in the second voice recognition model to obtain the transformed voice, and input the transformed voice into each recognition network of the recognition networks to obtain the initial text output by each recognition network.

These application scenarios may use the multiple recognition networks to accurately recognize the voice in the plurality of preset direction intervals.

In some alternative application scenarios of these implementations, the second voice recognition model may further include a direction interval determination module; after inputting a target voice into a pre-trained voice recognition model in step 201, the method may further include: obtaining a confidence of each initial text output by each of the recognition networks, where the number of initial text output by each of the recognition networks is at least one; and step 202 may include: determining a probability that the target voice has a sub-voice in each of direction intervals corresponding to the multiple recognition networks respectively, using the direction interval determination module; weighting, for each initial text, the confidence of the initial text output by the multiple recognition networks, by using the probability corresponding to each recognition network as a weight of the confidence of the initial text output by the recognition network; and using an initial text corresponding to a largest weighting result as the voice recognition result.

In these alternative application scenarios, the executing body may determine the confidence that the target voice has the sub-voice in each of the direction intervals using a recognition result fusion model. Each direction interval here corresponds to each of the multiple recognition networks.

The executing body may determine the probability that the target voice has the sub-voice in the direction interval corresponding to each recognition network output by the recognition result fusion model as the weight of the confidence of the initial text output by the recognition network, weight the confidence of the initial text output by each recognition network, and use the initial text having the largest weighting result in multiple initial texts as the voice recognition result.

In this application scenario, because each recognition network can accurately recognize the voice in the direction interval corresponding to the recognition network, when the voice is in a certain direction interval, the executing body gives a greater weight to the confidence of the initial text output by the recognition network corresponding to the direction interval, thereby improving the accuracy of the voice recognition result.

In some alternative application scenarios of these implementations, the second voice recognition model further includes the Fourier transform network; the inputting a target voice into a pre-trained voice recognition model to obtain an initial text output by at least one recognition network in the voice recognition model, includes: inputting the target voice into the pre-trained second voice recognition model, and performing Fourier transform on the target voice using the Fourier transform network to obtain the transformed voice; and the determining a probability that the target voice has a sub-voice in each of direction intervals corresponding to the multiple recognition networks respectively using the direction interval determination module, includes: inputting the transformed voice into the direction interval determination module, and determining by the direction interval determination module the probability that the target voice has the sub-voice in each of the direction intervals corresponding to the multiple recognition networks respectively, using a preset direction determination technology; where, the preset direction determination technology includes an arrival direction estimation algorithm or a pre-trained deep neural network, and the deep neural network is configured to predict a direction interval of arrival of voice.

In these application scenarios, the executing body may input the transformed voice into the direction interval determination module, so as to use the module to use the preset direction determination technology. In practice, the arrival direction estimation algorithm may be a generalized correlation function arrival direction algorithm. The deep neural network may be of various types, such as convolutional neural networks or residual neural networks.

In these application scenarios, the preset direction determination technology may be used to process the transformed voice, thereby improving the accuracy of determining a direction interval.

Figure 3B:
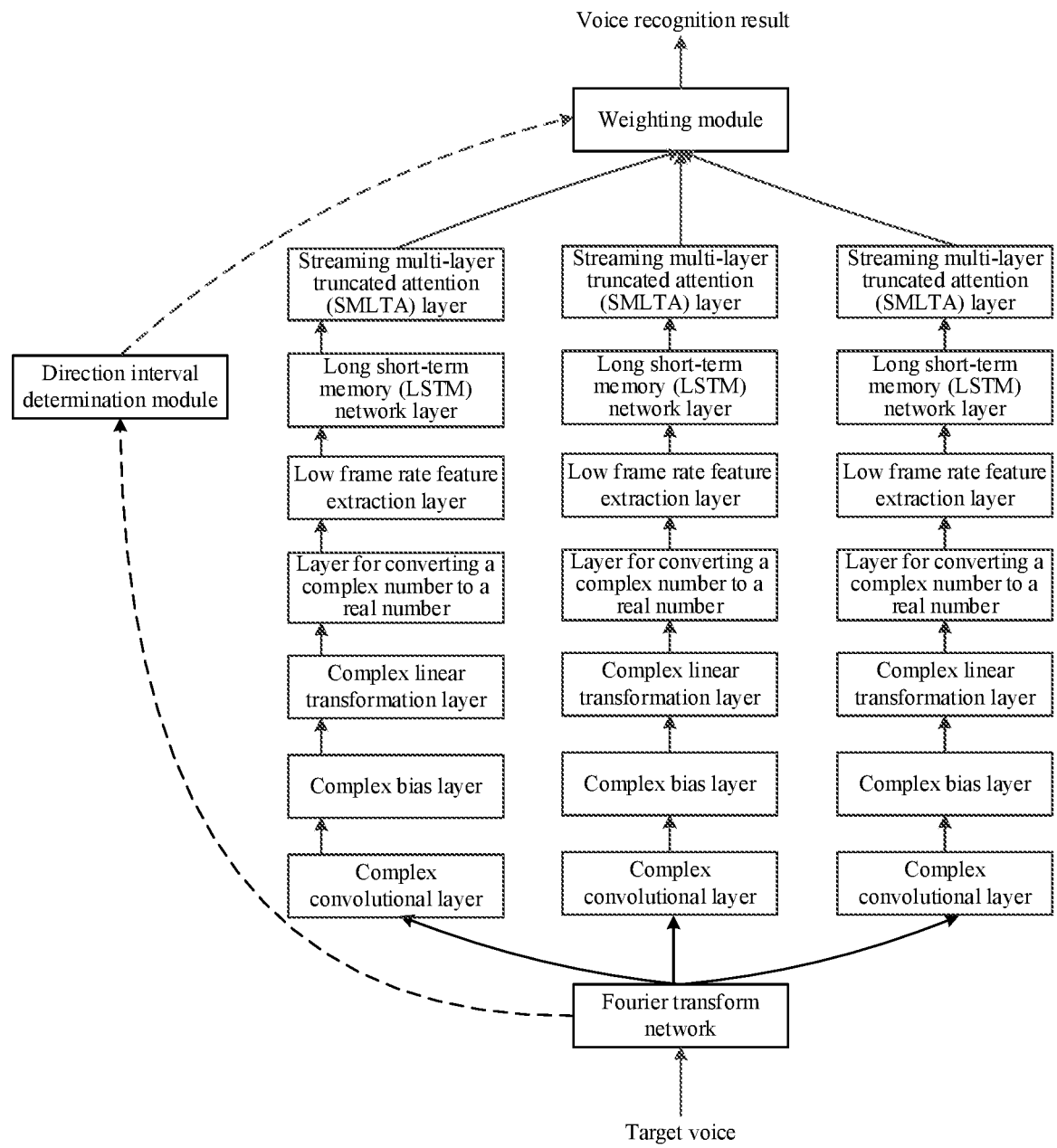
FIG. 3b is a flowchart of performing voice recognition based on a second voice recognition model of the method for recognizing a voice of the present disclosure.

With further reference to FIG. 3b, illustrating a process of performing recognition on a target voice using a second voice recognition model including multiple recognition networks.

The present disclosure also provides another embodiment of the method for recognizing a voice, in this embodiment, in response to the voice recognition model being a third voice recognition model, the recognition network includes an omnidirectional network and multiple directional networks. Any one of the directional networks, and the omnidirectional network include multiple preset types of processing layers; and the multiple directional networks respectively correspond to multiple preset direction intervals.

In the present embodiment, if the voice recognition model is the third voice recognition model, the recognition network may include the omnidirectional network and the directional networks. There may be multiple directional networks. Each of the directional networks may correspond to one of the multiple direction intervals. Any two directional networks correspond to different direction intervals. An output of the omnidirectional network may be used as input of the directional networks.

In the present embodiment, the recognition network may be divided into a network of two phases, so that an input voice may be parameter shared in the omnidirectional network in an omnidirectional network phase, and the directional networks may be used to improve the accuracy of voice recognition in different direction intervals. The omnidirectional network functions to compress storage space and save computing resources by parameter sharing.

In some alternative implementations of the present embodiment, the third voice recognition model further includes a Fourier transform network; the inputting a target voice into a pre-trained voice recognition model to obtain an initial text output by at least one recognition network in the voice recognition model, includes: inputting the target voice into a pre-trained third voice recognition model, and performing Fourier transform on the target voice using the Fourier transform network to obtain a transformed voice; inputting the transformed voice into the omnidirectional network to obtain a voice feature output by the omnidirectional network; and inputting the voice feature into each directional network of the multiple directional networks to obtain the initial text output by each directional network.

In these alternative implementations, the executing body may use the Fourier transform network and the omnidirectional network to obtain the voice feature of the target voice, and use the directional networks to continue processing the voice feature to obtain the initial text corresponding to the target voice.

In practice, the omnidirectional network may include a complex convolutional layer, a complex bias layer, a complex linear transformation layer, a layer for converting a complex number to a real number, a low frame rate feature extraction layer, and a long short-term memory (LSTM) network layer. The directional network may include a long and short-term memory network layer and a streaming multi-layer truncated attention layer.

These implementations may realize parameter sharing of the input voice and improve the accuracy of voice recognition in different direction intervals.

In some alternative implementations of the present embodiment, the third voice recognition model further includes a direction interval determination module; after inputting a target voice into a pre-trained voice recognition model, the method may further include: obtaining a confidence of each initial text output by each of the directional networks; and the determining a voice recognition result of the target voice, based on the initial text, includes: determining a probability that the target voice has a sub-voice in each of the direction intervals corresponding to the multiple directional networks respectively using the direction interval determination module; weighting, for each initial text, the confidence of the initial text output by the multiple directional networks, by using the probability corresponding to each directional network as a weight of the confidence of the initial text output by the directional network; and using an initial text corresponding to a largest weighting result as the voice recognition result.

In these alternative implementations, the executing body may use the direction interval determination module to weight the confidence of the initial text output by each directional network. When the sub-voice is in a certain direction interval, a large weight may be given to the confidence of the initial text output by the directional network corresponding to the certain direction interval, thereby improving the accuracy of the voice recognition result.

In some alternative implementations of the present embodiment, the third voice recognition model further includes the Fourier transform network; the inputting a target voice into a pre-trained voice recognition model to obtain an initial text output by at least one recognition network in the voice recognition model, includes: inputting the target voice into the pre-trained third voice recognition model, and performing Fourier transform on the target voice using the Fourier transform network to obtain the transformed voice; inputting the transformed voice into the omnidirectional network to obtain a processed voice feature output by a complex linear transformation layer of the omnidirectional network; and the determining a probability that the target voice has a sub-voice in each of the direction intervals corresponding to the multiple directional networks respectively using the direction interval determination module, includes: inputting the processed voice feature into the direction interval determination module, and determining by the direction interval determination module the probability that the target voice has the sub-voice in each of the direction intervals corresponding to the multiple directional networks respectively, using a preset direction determination technology; where, the preset direction determination technology includes an arrival direction estimation algorithm or a pre-trained deep neural network, and the deep neural network is configured to predict a direction interval of arrival of voice.

In these implementations, the executing body may use the feature output by the complex linear transformation layer in the omnidirectional network as the processed voice feature. Then, the executing body may use the direction interval determination module to process the processed voice feature, so as to obtain the probability that the target voice has the sub-voice in each direction interval.

In these implementations, the processed voice feature is obtained by fully extracting feature of the target voice, thereby helping the direction interval determination module to determine a more accurate direction of arrival.

Figure 3C:
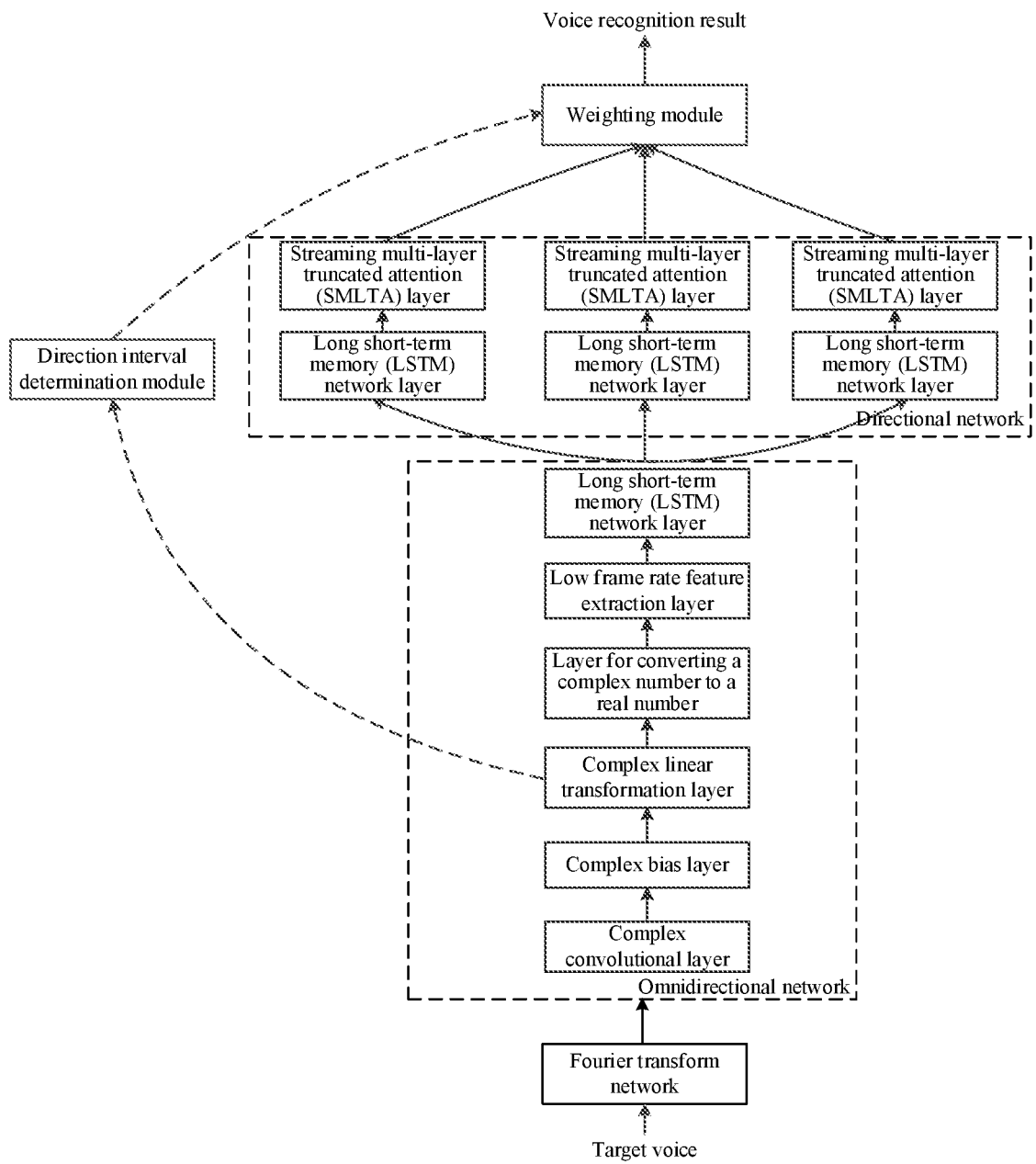
FIG. 3c is a flowchart of performing voice recognition based on a third voice recognition model of the method for recognizing a voice of the present disclosure.

With further reference to FIG. 3c, illustrating a process of performing voice recognition on a target voice using a third voice recognition model.

Figure 4A:
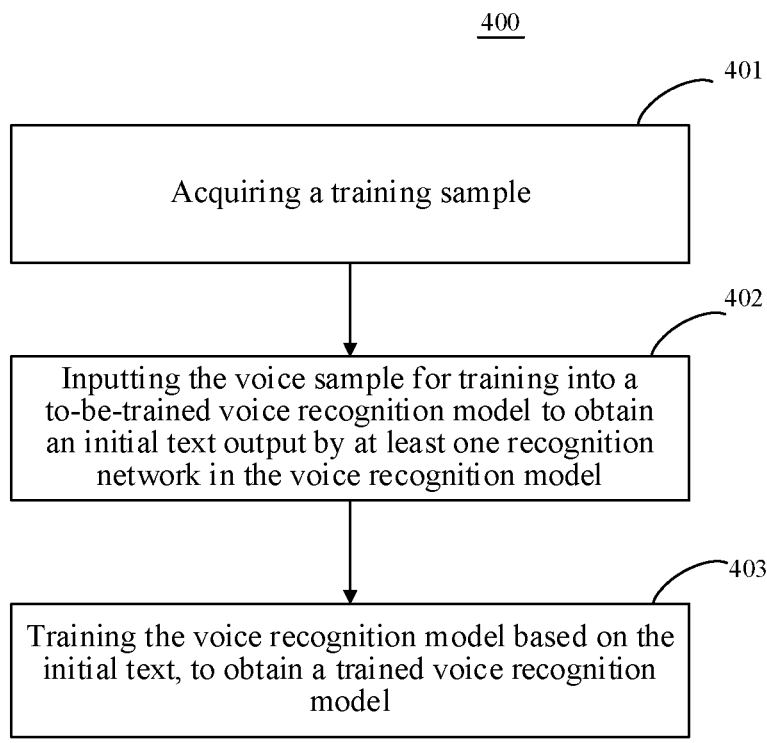
FIG. 4a is a flowchart of an embodiment of a method for training a voice recognition model according to the present disclosure.

With further reference to FIG. 4a, a flow 400 of an embodiment of a method for training a voice recognition model is illustrated. The flow 400 includes the following steps 401 to 403.

Step 401 includes acquiring a training sample, where a voice sample for training in the training sample includes a voice sample in a preset direction interval.

In the present embodiment, an executing body (for example, the server or terminal devices shown in FIG. 1) on which the method for training a voice recognition model is run may acquire the training sample. The training sample includes the voice sample for training, and the voice sample for training may include the voice sample in the preset direction interval. If the voice sample for training also includes other voice samples other than the voice sample in the preset direction interval, then both the voice sample in the preset direction interval and the other voice samples may be sub-voices in the voice sample for training.

Step 402 includes inputting the voice sample for training into a to-be-trained voice recognition model to obtain an initial text output by at least one recognition network in the voice recognition model, the recognition network including multiple preset types of processing layers.

In the present embodiment, the executing body may input the voice sample for training into the voice recognition network, to obtain the initial text output by the at least one recognition network in the voice recognition model.

In practice, there may be different types of processing layers in the multiple processing layers of the recognition network. For example, one type of processing layer may be at least one convolutional layer such as a complex convolutional layer, and the other processing layer may be a bias layer such as complex bias layer. It should be noted that multiple in the present disclosure refers to at least two.

The recognition network may include multiple preset types of processing layers. In practice, the multiple types of processing layers may include a complex convolutional layer (complex conv2d), a complex bias layer (complex bias), a complex linear transformation layer (complex linear), a layer for conversion from a complex number to a real number, a low frame rate feature extraction layer (such as network structure Mobile Net designed for mobile terminals), a long short-term memory (LSTM) network layer, and a streaming multi-layer truncated attention (SMLTA) layer. Alternatively, before the complex convolutional layer, a Fourier transform layer may further be included. Each type of processing layer here may include one or at least two processing layers.

The above direction interval is a direction of arrival (DOA) interval. In practice, the direction interval may be one direction interval. In addition, the preset direction interval may alternatively be multiple direction intervals. For example, if there are multiple recognition networks in the at least one recognition network in the voice recognition model, each recognition network in the multiple recognition networks may be obtained based on voice training in a given direction interval. In the multiple recognition networks, direction intervals corresponding to any two recognition networks may be different. The direction of arrival here may refer to the direction of a sound source.

Step 403 includes training the voice recognition model to obtain a trained voice recognition model, based on the initial text.

In the present embodiment, the executing body may train the voice recognition model based on the initial text, so as to obtain the trained voice recognition model. In practice, the executing body may train the voice recognition model based on the initial text in various methods. For example, the executing body may input the initial text into a preset model in the voice recognition model, thereby obtaining a result output by the preset model, and the executing body may use the result as the voice recognition result. Then, the executing body may determine a loss value of the voice recognition result using the voice recognition result and a true text in the training sample, and perform back propagation in the voice recognition model using the loss value, so as to realize training, and obtaining the trained voice recognition model. Specifically, the training sample may also include a label corresponding to the voice sample, that is, the true text corresponding to the voice sample.

In some alternative implementations of the present embodiment, in response to the voice recognition model being a first voice recognition model, the at least one recognition network is one recognition network.

In some alternative application scenarios of these implementations, the first voice recognition model further includes a Fourier transform network; and step 401 may include: acquiring a first training sample, where the first training sample includes a first voice sample in one preset direction interval; and step 402 may include: inputting the first voice sample into the first voice recognition model, and performing Fourier transform on the first voice sample using the Fourier transform network to obtain a transformed voice; and inputting the transformed sample into the one recognition network to obtain an initial text predicting a text corresponding to the first voice sample.

In these alternative application scenarios, the executing body may use the one recognition network to determine the initial text corresponding to the first voice sample. The executing body may use the Fourier transform (such as a Fast Fourier Transform, FFT) network to perform Fourier transform on the target voice. In addition, the executing body may use a text predicted by the recognition network as the initial text.

These application scenarios may realize forward propagation of the first voice recognition model in the training process.

In some alternative application scenarios of these implementations, step 403 may include: determining a loss value of the voice recognition result using the initial text as a voice recognition result, and performing back propagation in the first voice recognition model using the loss value to update a parameter in the first voice recognition model to obtain a trained first voice recognition model.

In these alternative application scenarios, the executing body may determine a first loss value based on the initial text used as the voice recognition result. Specifically, the training sample, such as the first training sample, may further include a label corresponding to the first voice sample, that is, the true text corresponding to the first voice sample. The executing body may use the voice recognition result, the true text, and a preset loss function to determine the loss value of the voice recognition result, and may use the loss value as the first loss value. Specifically, the executing body may substitute a vector corresponding to the voice recognition result and a vector corresponding to the true text into the preset loss function to obtain the first loss value.

Then, the executing body may use the first loss value to perform back propagation in the first voice recognition model, thereby updating the parameter in the first voice recognition model. The first voice recognition model with an update parameter is the trained first voice recognition model. In practice, the executing body may use the first loss value to perform back propagation in the above recognition network to update parameter in the recognition network to obtain the trained first voice recognition model.

These application scenarios may perform training using voice samples limited in one direction interval, thereby helping to improve an accuracy for recognizing the voice in the direction interval by the trained voice recognition model.

In some alternative implementations of the present embodiment, in response to the voice recognition model being a second voice recognition model, the at least one recognition network is multiple recognition networks; and the multiple recognition networks respectively correspond to multiple preset direction intervals.

In some alternative application scenarios of these implementations, the second voice recognition model further includes a Fourier transform network; step 401 may include: acquiring multiple second training samples, where each of the second training samples includes a second voice sample in one direction interval of the multiple direction intervals, and in multiple second voice samples included in the multiple second training samples, a second voice sample of each of the direction intervals is included; and step 402 may include: inputting the second voice sample into the Fourier transform network to obtain a transformed sample; and for each recognition network of the multiple recognition networks, inputting the transformed sample into the recognition network, to obtain an initial text predicting the second voice sample and being output by the recognition network, in response to the second voice sample being in a direction interval corresponding to the recognition network.

In these alternative application scenarios, the executing body may use the Fourier transform network to perform Fourier transform on each second voice sample to obtain the transformed sample, and for each recognition network, if the second voice sample is in the direction interval corresponding to the recognition network, the recognition network is used to process the transformed sample. That is, the executing body may acquire second voice samples in different direction intervals.

These application scenarios may realize forward propagation of the second voice recognition model in the training process.

In some alternative application scenarios of these implementations, step 403 may include: determining, for the initial text corresponding to each recognition network, a loss value of the initial text, and performing back propagation in the recognition network using the loss value to update a parameter in the recognition network; and using a second voice recognition model, of which parameters of the multiple recognition networks are updated, as a trained second voice recognition model.

In these alternative application scenarios, the executing body may use voice samples in different direction intervals, such as the second voice samples, to separately train each recognition network. The training sample, such as the second training sample, may include a true sample corresponding to the second voice sample. The executing body may determine the loss value of the initial text for each recognition network using the initial text output from the recognition network, the true text and the preset loss function, and perform back propagation in the recognition network using the loss value. In this way, the executing body performs back propagation in the multiple recognition networks to update the parameters in the multiple recognition networks.

These application scenarios may realize back propagation of the second voice recognition model in the training process.

In some alternative implementations of the present embodiment, in response to the voice recognition model being a third voice recognition model, the recognition network includes an omnidirectional network and multiple directional networks, and any one of the directional networks and the omnidirectional network include multiple preset types of processing layers; and the multiple directional networks respectively correspond to multiple preset direction intervals.

In some alternative application scenarios of these implementations, a network structure of the third voice recognition model for training includes a voice directional layer; step 401 may include: acquiring a training sample of a third voice sample in the multiple direction intervals; and step 402 may include: inputting the third voice sample into the Fourier transform network to obtain a transformed third sample, where the third voice sample includes a sub-voice in at least one direction interval; inputting the transformed third sample into the omnidirectional network to obtain a voice feature output by the omnidirectional network; determining, using the voice directional layer, in the voice feature, a sub-voice feature corresponding to a sub-voice in any one of the multiple direction intervals, and using a directional network corresponding to any one of the directional intervals as a to-be-input directional network of the sub-voice feature; and inputting the sub-voice feature into the to-be-input directional network, to obtain an initial text predicting the third voice sample and being output by the to-be-input directional network.

In these alternative application scenarios, the executing body may use the voice directional layer to determine the directional network from the multiple directional networks, to which the sub-voice feature in the voice feature output by the omnidirectional network is to be input, so as to realize allocation of the sub-voice feature according to the direction interval of the sub-voice, so that each directional network can learn the voice feature in a specific direction interval. In practice, the voice directional layer may acquire a direction of the sub-voice in the target voice, so as to realize the above allocation. In practice, the direction of the sub-voice is the direction of a sound source. In the training phase, the direction may be generated by a simulation module.

These application scenarios may realize forward propagation of the third voice recognition model in the training process. Specifically, these application scenarios may use the voice directional layer to determine the directional network to which the sub-voice feature is to be input, so as to realize the use of voice in a specific direction interval to train the directional network, thereby improving the accuracy for recognizing the voice in the specific direction interval by the directional network.

In some alternative application scenarios of these implementations, step 403 may include: determining, for the initial text corresponding to each directional network, a loss value of the initial text, and performing back propagation in the third voice recognition model based on the loss value to update a parameter in the third voice recognition model.

In these alternative application scenarios, the Fourier transform network, the omnidirectional network, and the directional networks are used in these implementations to finally realize the process of updating the parameter in the third voice recognition model, which may be the whole process of training the third voice recognition model, or may be a first phase of training.

These application scenarios may realize back propagation of the third voice recognition model in the training process.

Figure 4B:
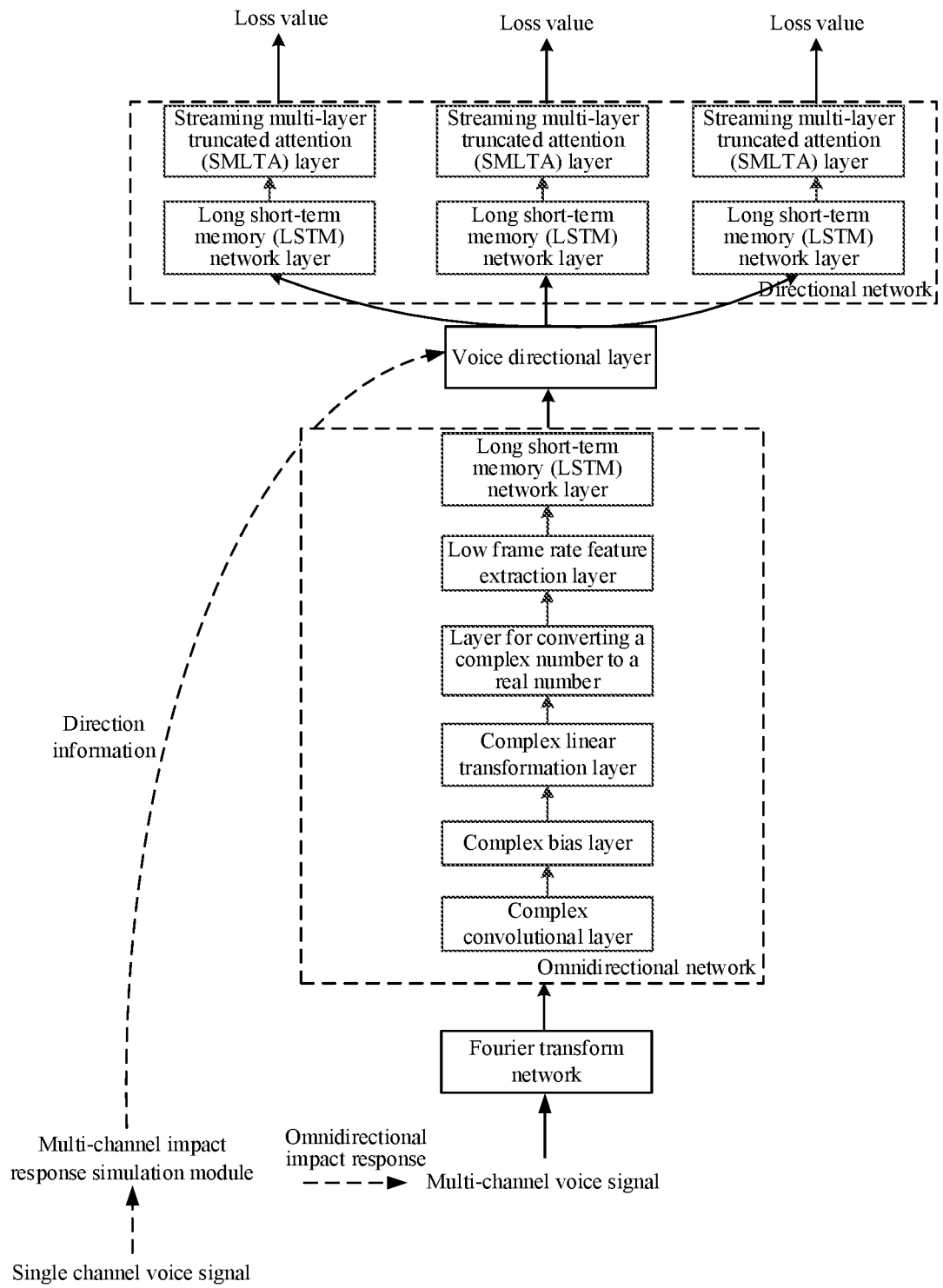
FIG. 4b is a schematic diagram of a network structure for first phase training of a third voice recognition model of the method for recognizing a voice according to the present disclosure.

As shown in FIG. 4b, illustrating a network structure of a third voice recognition model for first phase training.

In some alternative cases of these application scenarios, the third voice recognition model further includes a direction interval determination module; the performing back propagation in the third voice recognition model based on the loss value to update a parameter in the third voice recognition model in these application scenarios, may include: for each directional network, performing back propagation in the directional network by using the loss value obtained for the directional network, to obtain a back propagation result; combining back propagation results corresponding to the multiple directional networks using the direction interval determination module, to obtain a propagation result set; and performing back propagation in the omnidirectional network to update a parameter of the omnidirectional network and parameters of the multiple directional networks, using the combined propagation result set.

In these alternative cases, the executing body may use the direction interval determination module to combine the back propagation results of the directional networks to obtain a set of these propagation results, and may use the propagation result set to perform back propagation in the omnidirectional network, so that the parameter of the omnidirectional network is affected by the voice in each direction interval, and the feature of the voice in each direction interval may be accurately extracted. The parameters in the directional network may be affected only by the voice in a single direction interval, to accurately extract the feature of the voice in a certain direction interval.

In some alternative application scenarios of these implementations, the third voice recognition model further includes a direction interval determination module; after inputting the sub-voice feature into the to-be-input directional network, the method further includes: obtaining a confidence of each initial text output by each of the directional networks; and the method further includes: determining a probability that the third voice sample has a sub-voice in each of direction intervals corresponding to the multiple directional networks respectively using the direction interval determination module; weighting the confidence of each initial text output by the multiple directional networks, by using the probability corresponding to each directional network as a weight of the confidence of the initial text output by the directional network; and determining a loss value of the voice recognition result using an initial text corresponding to the largest weighting result as the voice recognition result, and performing back propagation in the third voice recognition model using the loss value to update a parameter in the third voice recognition model to obtain a trained third voice recognition model.

In these alternative application scenarios, the executing body may perform the second phase training. When the sub-voice is in a certain direction interval, the executing body may give a large weight to the confidence of the initial text output by the directional network corresponding to the direction interval, thereby further improving the accuracy of the voice recognition result.

Figure 4C:
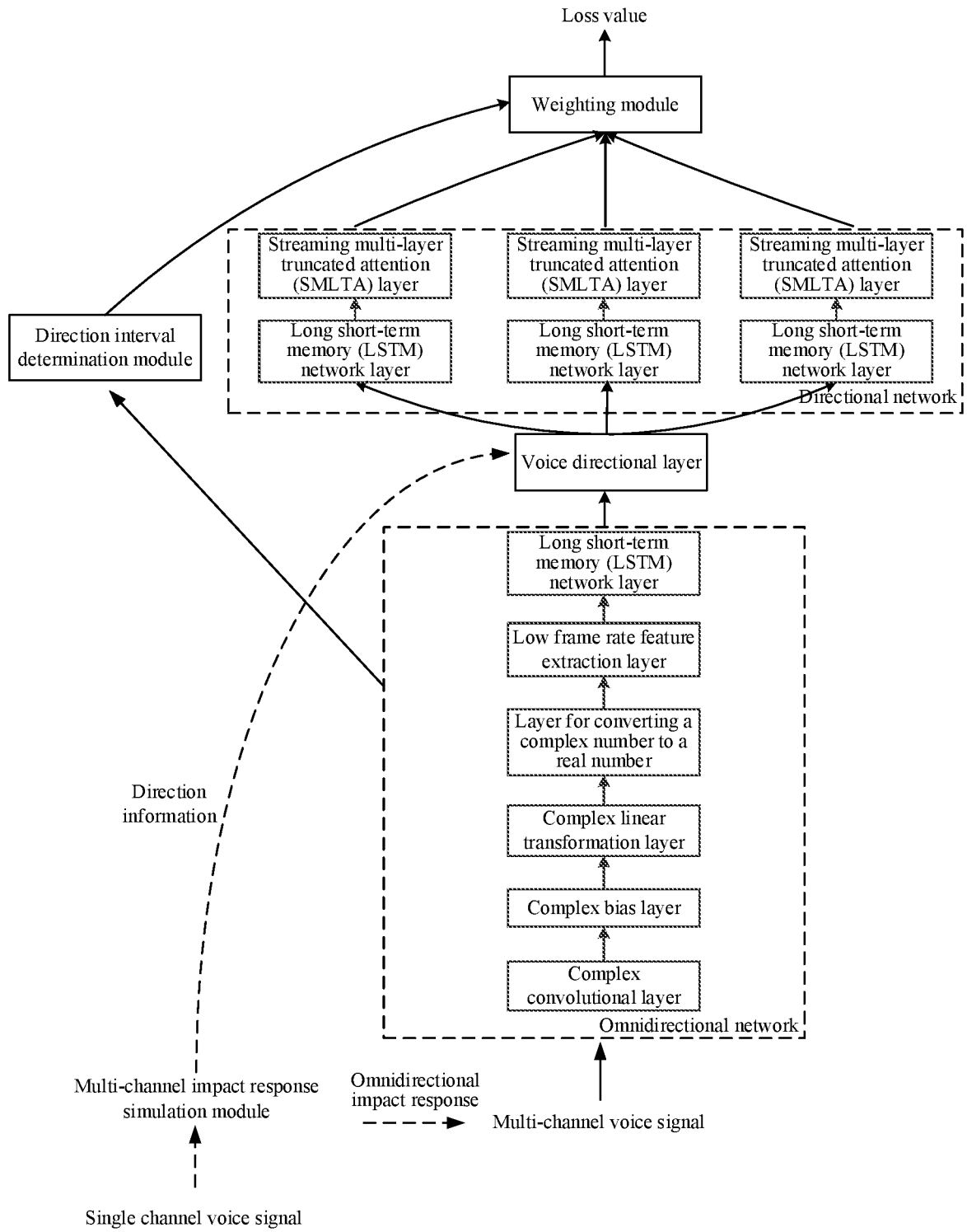
FIG. 4c is a schematic diagram of a network structure for second phase training of a third voice recognition model of the method for recognizing a voice according to the present disclosure.

As shown in FIG. 4c, illustrating a network structure for second phase training of a third voice recognition model.

Figure 5:
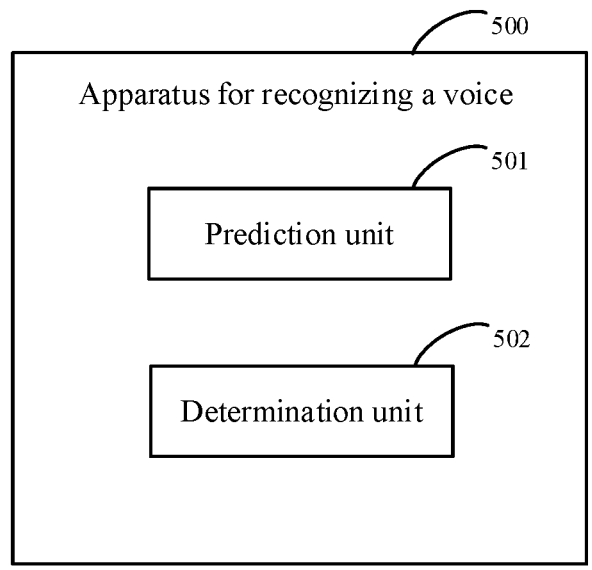
FIG. 5 is a schematic structural diagram of an embodiment of an apparatus for recognizing a voice according to the present disclosure.

With further reference to FIG. 5, as an implementation of the method shown in FIG. 2 and FIG. 3, the present disclosure provides an embodiment of an apparatus for recognizing a voice, and the apparatus embodiment corresponds to the method embodiment as shown in FIG. 2. In addition to the features described below, the apparatus embodiment may also include the same or corresponding features or effects as the method embodiment shown in FIG. 2. The apparatus may be specifically applied to various electronic devices.

As shown in FIG. 5, an apparatus 500 for recognizing a voice of the present embodiment includes: a prediction unit 501 and a determination unit 502. The prediction unit 501 is configured to input a target voice into a pre-trained voice recognition model to obtain an initial text output by at least one recognition network in the voice recognition model, the recognition network including multiple preset types of processing layers, and at least one type of processing layer of the recognition network being obtained by training based on a voice sample in a preset direction interval. The determination unit 502 is configured to determine a voice recognition result of the target voice, based on the initial text.

In the present embodiment, for the specific processing and technical effects thereof of the prediction unit 501 and the determination unit 502 in the apparatus 500 for recognizing a voice, reference may be made to the relevant descriptions of step 201 and step 202 in the corresponding embodiment of FIG. 2 respectively, and detailed description thereof will be omitted.

In some alternative implementations of the present embodiment, in response to the voice recognition model being a first voice recognition model, the at least one recognition network is one recognition network.

In some alternative implementations of the present embodiment, the first voice recognition model further includes a Fourier transform network; the prediction unit is further configured to input a target voice into a pre-trained voice recognition model to obtain an initial text output by at least one recognition network in the voice recognition model as follows: inputting the target voice into a pre-trained first voice recognition model, and performing Fourier transform on the target voice using the Fourier transform network to obtain a transformed voice; predicting a text corresponding to the transformed voice using the one recognition network to obtain the initial text; and the determination unit is further configured to determine a voice recognition result of the target voice, based on the initial text as follows: determining the initial text as the voice recognition result of the target voice.

In some alternative implementations of the present embodiment, in response to the voice recognition model being a second voice recognition model, the at least one recognition network is multiple recognition networks; and the multiple recognition networks respectively correspond to multiple preset direction intervals.

In some alternative implementations of the present embodiment, the second voice recognition model further includes a Fourier transform network; the prediction unit is further configured to input a target voice into a pre-trained voice recognition model to obtain an initial text output by at least one recognition network in the voice recognition model as follows: inputting the target voice into a pre-trained second voice recognition model, and performing Fourier transform on the target voice using the Fourier transform network to obtain a transformed voice; and inputting the transformed voice into each of the multiple recognition networks to obtain the initial text output by each recognition network.

In some alternative implementations of the present embodiment, the second voice recognition model further includes a direction interval determination module; the apparatus further includes: an output unit, configured to, after inputting a target voice into a pre-trained voice recognition model, obtain a confidence of each initial text output by each of the recognition networks; and the determination unit is further configured to determine a voice recognition result of the target voice, based on the initial text as follows: determining a probability that the target voice has a sub-voice in each of direction intervals corresponding to the multiple recognition networks respectively using the direction interval determination module; weighting, for each initial text, the confidence of the initial text output by the multiple recognition networks, by using the probability corresponding to each recognition network as a weight of the confidence of the initial text output by the recognition network; and using an initial text corresponding to a largest weighting result as the voice recognition result.

In some alternative implementations of the present embodiment, the second voice recognition model further includes the Fourier transform network; the prediction unit is further configured to input a target voice into a pre-trained voice recognition model to obtain an initial text output by at least one recognition network in the voice recognition model as follows: inputting the target voice into the pre-trained second voice recognition model, and performing Fourier transform on the target voice using the Fourier transform network to obtain the transformed voice; and the determination unit is further configured to determine a probability that the target voice has a sub-voice in each of direction intervals corresponding to the multiple recognition networks respectively using the direction interval determination module as follows: inputting the transformed voice into the direction interval determination module, and determining by the direction interval determination module the probability that the target voice has the sub-voice in each direction interval corresponding to the multiple recognition networks respectively, using a preset direction determination technology; where, the preset direction determination technology includes an arrival direction estimation algorithm or a pre-trained deep neural network, and the deep neural network is configured to predict a direction interval of arrival of voice.

In some alternative implementations of the present embodiment, in response to the voice recognition model being a third voice recognition model, the recognition network includes an omnidirectional network and multiple directional networks, any one of the directional networks and the omnidirectional network include multiple preset types of processing layers; and the multiple directional networks respectively correspond to multiple preset direction intervals.

In some alternative implementations of the present embodiment, the third voice recognition model further includes a Fourier transform network; the prediction unit is further configured to input a target voice into a pre-trained voice recognition model to obtain an initial text output by at least one recognition network in the voice recognition model as follows: inputting the target voice into a pre-trained third voice recognition model, and performing Fourier transform on the target voice using the Fourier transform network to obtain a transformed voice; inputting the transformed voice into the omnidirectional network to obtain a voice feature output by the omnidirectional network; and inputting the voice feature into each directional network of the multiple directional networks to obtain the initial text output by each directional network.

In some alternative implementations of the present embodiment, the third voice recognition model further includes a direction interval determination module; the apparatus further includes: an execution unit, configured to, after inputting a target voice into a pre-trained voice recognition model, obtain a confidence of each initial text output by each of the directional networks; and the determination unit is further configured to determine a voice recognition result of the target voice, based on the initial text as follows: determining a probability that the target voice has a sub-voice in each of direction intervals corresponding to the multiple directional networks respectively using the direction interval determination module; weighting, for each initial text, the confidence of the initial text output by the multiple directional networks, by using the probability corresponding to each directional network as a weight of the confidence of the initial text output by the directional network; and using an initial text corresponding to a largest weighting result as the voice recognition result.

In some alternative implementations of the present embodiment, the third voice recognition model further includes the Fourier transform network; the prediction unit is further configured to input a target voice into a pre-trained voice recognition model to obtain an initial text output by at least one recognition network in the voice recognition model as follows: inputting the target voice into the pre-trained third voice recognition model, and performing Fourier transform on the target voice using the Fourier transform network to obtain the transformed voice; inputting the transformed voice into the omnidirectional network to obtain a processed voice feature output by a complex linear transformation layer of the omnidirectional network; and the determining a probability that the target voice has a sub-voice in each of direction intervals corresponding to the multiple directional networks respectively using the direction interval determination module, includes: inputting the processed voice feature into the direction interval determination module, and determining by the direction interval determination module the probability that the target voice has the sub-voice in each of direction intervals corresponding to the multiple recognition networks respectively, using a preset direction determination technology; where, the preset direction interval determination technology includes an arrival direction estimation algorithm or a pre-trained deep neural network, and the deep neural network is configured to predict a direction interval of arrival of voice.

As an implementation of the method shown in FIG. 4*a*, the present disclosure provides an embodiment of an apparatus for training a voice recognition model, and the apparatus embodiment corresponds to the method embodiment as shown in FIG. 4*a*. In addition to the features described below, the apparatus embodiment may also include the same or corresponding features or effects as the method embodiment shown in FIG. 4*a*. The apparatus may be specifically applied to various electronic devices.

The apparatus for training a voice recognition model of the present embodiment includes: an acquisition unit, an input unit and a training unit. The acquisition unit is configured to acquire a training sample, where a voice sample for training in the training sample includes a voice sample in a preset direction interval. The input unit is configured to input the voice sample for training into a to-be-trained voice recognition model to obtain an initial text output by at least one recognition network in the voice recognition model, the recognition network including multiple preset types of processing layers. The training unit is configured to train the voice recognition model to obtain a trained voice recognition model, based on the initial text.

In the present embodiment, for the specific processing and technical effects thereof of the acquisition unit, the input unit and the training unit in the apparatus for training a voice recognition model, reference may be made to the relevant descriptions of step 401, step 402 and step 403 in the corresponding embodiment of FIG. 4*a* respectively, and detailed description thereof will be omitted.

In some alternative implementations of the present embodiment, in response to the voice recognition model being a first voice recognition model, the at least one recognition network is one recognition network.

In some alternative implementations of the present embodiment, the first voice recognition model further includes a Fourier transform network; the acquisition unit is further configured to acquire a training sample as follows: acquiring a first training sample, where the first training sample includes a first voice sample in one preset direction interval; and the input unit is further configured to input the voice sample for training into the to-be-trained voice recognition model to obtain an initial text output by at least one recognition network in the voice recognition model as follows: inputting the first voice sample into the first voice recognition model, and performing Fourier transform on the first voice sample using the Fourier transform network to obtain a transformed sample; and inputting the transformed sample into a recognition network to obtain an initial text predicting a text corresponding to the first voice sample.

In some alternative implementations of the present embodiment, the training unit is further configured to train the voice recognition model to obtain a trained voice recognition model, based on the initial text as follows: determining a loss value of the voice recognition result by using the initial text as a voice recognition result, and performing back propagation in the first voice recognition model using the loss value to update a parameter in the first voice recognition model to obtain a trained first voice recognition model.

In some alternative implementations of the present embodiment, in response to the voice recognition model being a second voice recognition model, the at least one recognition network is multiple recognition networks; and the multiple recognition networks respectively correspond to multiple preset direction intervals.

In some alternative implementations of the present embodiment, the second voice recognition model further includes a Fourier transform network; the acquisition unit is further configured to acquire a training sample as follows: acquiring multiple second training samples, where each of the second training samples includes a second voice sample in one direction interval of the multiple direction intervals, and in multiple second voice samples included in the multiple second training samples, a second voice sample in each of the direction intervals is included; and the input unit is further configured to input the voice sample for training into the to-be-trained voice recognition model to obtain an initial text output by at least one recognition network in the voice recognition model as follows: inputting the second voice sample into the Fourier transform network to obtain a transformed sample; and for each recognition network of the multiple recognition networks, inputting the transformed sample into the recognition network, to obtain an initial text predicting the second voice sample and being output by the recognition network, in response to the second voice sample being in a direction interval corresponding to the recognition network.

In some alternative implementations of the present embodiment, the training unit is further configured to train the voice recognition model to obtain a trained voice recognition model, based on the initial text as follows: determining, for the initial text corresponding to each recognition network, a loss value of the initial text, and performing back propagation in the recognition network using the loss value to update a parameter in the recognition network; and using a second voice recognition model, of which parameters of the multiple recognition networks are updated, as a trained second voice recognition model.

In some alternative implementations of the present embodiment, in response to the voice recognition model being a third voice recognition model, the recognition network includes an omnidirectional network and multiple directional networks, any one of the directional networks and the omnidirectional network include multiple preset types of processing layers; and the multiple directional networks respectively correspond to multiple preset direction intervals.

In some alternative implementations of the present embodiment, a network structure of the third voice recognition model for training includes a voice directional layer; the acquisition unit is further configured to acquire a training sample as follows: acquiring a training sample of a third voice sample included in the multiple direction intervals; and the input unit is further configured to input the voice sample for training into the to-be-trained voice recognition model to obtain an initial text output by at least one recognition network in the voice recognition model as follows: inputting the third voice sample into the Fourier transform network to obtain a transformed third sample, where the third voice sample includes a sub-voice in at least one direction interval; inputting the transformed third sample into the omnidirectional network to obtain a voice feature output by the omnidirectional network; determining, using the voice directional layer, in the voice feature, a sub-voice feature corresponding to a sub-voice in any one of the multiple direction intervals, and using a directional network corresponding to any one of the directional intervals as a to-be-input directional network of the sub-voice feature; and inputting the sub-voice feature into the to-be-input directional network, to obtain an initial text predicting the third voice sample and being output by the to-be-input directional network.

In some alternative implementations of the present embodiment, the training unit is further configured to train the voice recognition model to obtain a trained voice recognition model, based on the initial text as follows: determining, for the initial text corresponding to each directional network, a loss value of the initial text, and performing back propagation in the third voice recognition model based on the loss value to update a parameter in the third voice recognition model.

In some alternative implementations of the present embodiment, the third voice recognition model further includes a direction interval determination module; the training unit is further configured to performing back propagation in the third voice recognition model based on the loss value to update a parameter in the third voice recognition model as follows: for each directional network, performing back propagation in the directional network, by using the loss value obtained by the directional network, to obtain a back propagation result; combining back propagation results corresponding to the multiple directional networks using the direction interval determination module, to obtain a propagation result set; and performing back propagation in the omnidirectional network to update a parameter of the omnidirectional network and parameters of the multiple directional networks, using the combined propagation result set.

In some alternative implementations of the present embodiment, the third voice recognition model further includes a direction interval determination module; the apparatus further includes: an execution unit, configured to, after inputting the sub-voice feature into the to-be-input directional network, obtain a confidence of each initial text output by each of the directional networks; and the apparatus further includes: a probability determination unit, configured to determine a probability that the third voice sample has a sub-voice in each of direction intervals corresponding to the multiple directional networks respectively using the direction interval determination module; a weighting unit, configured to weight the confidence of each initial text output by the multiple directional networks, by using the probability corresponding to each directional network as a weight of the confidence of the initial text output by the directional network; and a propagation unit, configured to determine a loss value of the voice recognition result using an initial text corresponding to a largest weighting result as the voice recognition result, and perform back propagation in the third voice recognition model using the loss value to update a parameter in the third voice recognition model to obtain a trained third voice recognition model.

According to an embodiment of the present disclosure, the present disclosure also provides an electronic device and a readable storage medium.

Figure 6:
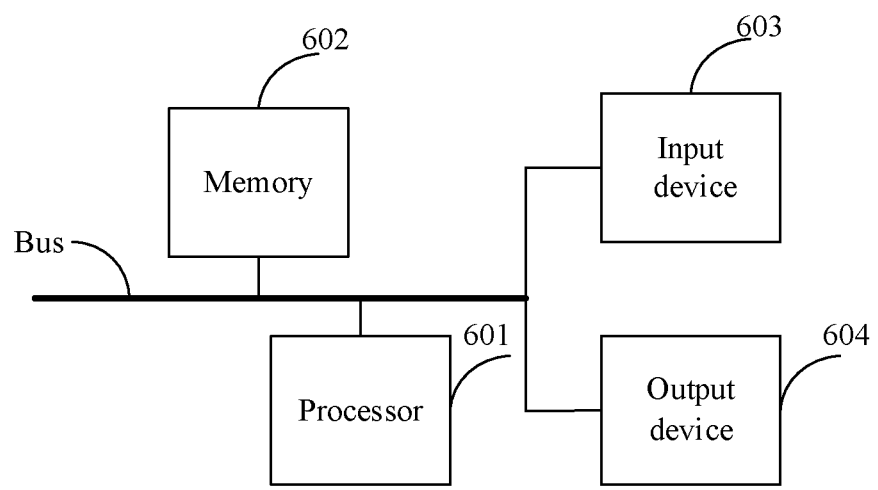
FIG. 6 is a block diagram of an electronic device adapted to implement the method for recognizing a voice according to an embodiment of the present disclosure.

As shown in FIG. 6, is a block diagram of an electronic device of the method for recognizing a voice according to an embodiment of the present disclosure, and is also a block diagram of an electronic device of the method for training a voice recognition model. The block diagram of the electronic device of the method for recognizing a voice is used as an example for the description as follows.

The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, multiple processors and/or multiple buses may be used together with multiple memories and multiple memories if desired. Similarly, multiple electronic devices may be connected, and the devices provide some necessary operations, for example, used as a server array, a set of blade servers, or a multiprocessor system. In FIG. 6, one processor 601 is used as an example.

The memory 602 is a non-transitory computer readable storage medium provided by the present disclosure. The memory stores instructions executable by at least one processor, so that the at least one processor performs the method for recognizing a voice provided by the present disclosure. The non-transitory computer readable storage medium of the present disclosure stores computer instructions for causing a computer to perform the method for recognizing a voice provided by the present disclosure.

The memory 602, as a non-transitory computer readable storage medium, may be used to store non-transitory software programs, non-transitory computer executable programs and modules, such as program instructions/modules corresponding to the method for recognizing a voice in the embodiments of the present disclosure (for example, the prediction unit 501 and the determination unit 502 as shown in FIG. 5). The processor 601 executes the non-transitory software programs, instructions, and modules stored in the memory 602 to execute various functional applications and data processing of the server, that is, to implement the method for recognizing a voice in the foregoing method embodiments.

The memory 602 may include a storage program area and a storage data area, where the storage program area may store an operating system and an application program required by at least one function; and the storage data area may store data created by the electronic device for recognizing a voice. In addition, the memory 602 may include a high-speed random access memory, and may further include a non-transitory memory, such as at least one magnetic disk storage device, a flash memory or other non-transitory solid state storage devices. In some embodiments, the memory 602 may alternatively include a memory disposed remotely relative to the processor 601, which may be connected through a network to the electronic device adapted to execute the method for recognizing a voice. Examples of such networks include, but are not limited to, the Internet, enterprise intranets, local area networks, mobile communication networks and combinations thereof.

The electronic device adapted to execute the method for recognizing a voice may further include an input device 603 and an output device 604. The processor 601, the memory 602, the input device 603 and the output device 604 may be interconnected through a bus or other means, and an example of a connection through a bus is shown in FIG. 6.

The input device 603 may receive input digit or character information, and generate key signal input related to user settings and functional control of the electronic device adapted to execute the method for recognizing a voice, such as a touch screen, a keypad, a mouse, a track pad, a touch pad, a pointer bar, one or more mouse buttons, a trackball or a joystick. The output device 604 may include a display device, an auxiliary lighting device (such as an LED) and a tactile feedback device (such as a vibration motor). The display device may include, but is not limited to, a liquid crystal display (LCD), a light emitting diode (LED) display and a plasma display. In some embodiments, the display device may be a touch screen.

The various embodiments of the systems and technologies described herein may be implemented in digital electronic circuit systems, integrated circuit systems, ASICs (application specific integrated circuits), computer hardware, firmware, software and/or combinations thereof. The various embodiments may include: being implemented in one or more computer programs, where the one or more computer programs may be executed and/or interpreted on a programmable system including at least one programmable processor, and the programmable processor may be a dedicated or general-purpose programmable processor, which may receive data and instructions from a memory system, at least one input device and at least one output device, and send the data and instructions to the memory system, the at least one input device and the at least one output device.

These computing programs (also known as programs, software, software applications or code) include machine instructions of a programmable processor and may be implemented in high-level procedures and/or object-oriented programming languages, and/or assembly or machine languages. As used herein, the terms "machine readable medium" and "computer readable medium" refer to any computer program product, device and/or apparatus (such as magnetic disk, optical disk, memory and programmable logic device (PLD)) for providing machine instructions and/or data to a programmable processor, including a machine readable medium that receives machine instructions as machine readable signals. The term "machine readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementation of the systems and technologies described herein), or a computing system including any combination of such background component, middleware component or front-end component. The components of the system may be interconnected by any form or medium of digital data communication (such as a communication network). Examples of communication networks include a local area network (LAN), a wide area network (WAN), and the Internet.

The computer system may include a client and a server. The client and the server are typically remote from each other and typically interact through a communication network. The relationship between the client and the server is generated by a computer program running on the corresponding computer and having a client-server relationship with each other.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor, including the prediction unit 501 and the determination unit 501. Here, the names of these units do not in some cases constitute limitations to such units themselves. For example, the determination unit may also be described as "a unit configured to determine a voice recognition result of the target voice, based on the initial text."

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: input a target voice into a pre-trained voice recognition model to obtain an initial text output by at least one recognition network in the voice recognition model, the recognition network including multiple preset types of processing layers, and at least one type of processing layer of the recognition network being obtained by training based on a voice sample in a preset direction interval; and determine a voice recognition result of the target voice, based on the initial text.

In another aspect, the present disclosure further provides a computer readable medium. The computer readable medium may be included in the apparatus in the above described embodiments, or a stand-alone computer readable medium not assembled into the apparatus. The computer readable medium stores one or more programs. The one or more programs, when executed by the apparatus, cause the apparatus to: acquire a training sample, a voice sample for training in the training sample including a voice sample in a preset direction interval; input the voice sample for training into a to-be-trained voice recognition model to obtain an initial text output by at least one recognition network in the voice recognition model, the recognition network including multiple preset types of processing layers; and train the voice recognition model to obtain a trained voice recognition model, based on the initial text.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing a voice, the method comprising:
    inputting a target voice into a pre-trained voice recognition model to obtain an initial text output by at least one recognition network in the voice recognition model, wherein the at least one recognition network comprises an omnidirectional network and a plurality of directional networks, each of the plurality of directional networks being obtained by training using a voice sample in a different direction interval, wherein inputting the target voice into the pre-trained voice recognition model to obtain the initial text output by the at least one recognition network in the voice recognition model comprises:
    inputting a transformed voice obtained from the target voice into the omnidirectional network to obtain a given voice feature output by a complex linear transformation layer of the omnidirectional network, and
    inputting the given voice feature into each of the plurality of directional networks to obtain an initial sub-text output by each directional network, wherein each of the plurality of directional networks comprises a long short-term memory network layer and a streaming multi-layer truncated attention layer; and
    determining a voice recognition result of the target voice, based on the initial text comprising the initial sub-text output by each directional network.

2. The method according to claim 1, wherein the at least one recognition network further comprises a Fourier transform network;
    the inputting the target voice into the pre-trained voice recognition model to obtain the initial text output by the at least one recognition network in the voice recognition model, comprises:
    inputting the target voice into the Fourier transform network, and performing Fourier transform on the target voice using the Fourier transform network to obtain the transformed voice.

3. The method according to claim 1, wherein the voice recognition model further comprises a direction interval determination module;
    after inputting the target voice into the pre-trained voice recognition model, the method further comprises:
    obtaining a confidence of each initial sub-text output by each of the directional networks; and
    the determining the voice recognition result of the target voice, based on the initial text comprising the initial sub-text output by each of the directional networks, comprises:
    determining a probability that the target voice has a sub-voice in each of the direction intervals corresponding to the plurality of directional networks respectively, using the direction interval determination module;
    weighting, for each initial sub-text, the confidence of the each initial sub-text output by the plurality of directional networks, by using the probability corresponding to each directional network as a weight of the confidence of the each initial sub-text output by the each directional network; and
    using an initial sub-text corresponding to a largest weighting result as the voice recognition result.

4. The method according to claim 3, wherein the voice recognition model further comprises the Fourier transform network;
    the inputting the target voice into the pre-trained voice recognition model to obtain the initial text output by the at least one recognition network in the voice recognition model, comprises:
    inputting the target voice into the Fourier transform network, and performing Fourier transform on the target voice using the Fourier transform network to obtain the transformed voice;
    and
    the determining the probability that the target voice has the sub-voice in each of the direction intervals corresponding to the plurality of directional networks respectively, using the direction interval determination module, comprises:
    inputting the processed voice feature into the direction interval determination module, and determining by the direction interval determination module the probability that the target voice has the sub-voice in each of the direction intervals corresponding to the plurality of directional networks respectively, using a preset direction determination technology;
    wherein, the preset direction determination technology comprises an arrival direction estimation algorithm or a pre-trained deep neural network, and the deep neural network is configured to predict a direction interval of arrival of voice.

5. A non-transitory computer readable storage medium, storing a computer program thereon, the program, when executed by a processor, implements the method according to claim 1.

6. The method according to claim 1, wherein the omnidirectional network further comprises a complex convolutional layer, a complex bias layer, a layer for converting a complex number to a real number, a low frame rate feature extraction layer, and a long short-term memory network layer.

7. A method for training a voice recognition model, the method comprising:
acquiring a training sample, the training sample comprising voice samples in a plurality of direction intervals;
inputting the voice samples into a to-be-trained voice recognition model to obtain an initial text output by at least one recognition network in the voice recognition model, wherein the at least one recognition network comprises an omnidirectional network, a voice directional layer, and a plurality of directional networks, wherein each of the plurality of directional networks comprises a long short-term memory network layer and a streaming multi-layer truncated attention layer, wherein the inputting the voice samples into the to-be-trained voice recognition model to obtain the initial text output by at least one recognition network in the voice recognition model, comprises:
inputting voice features transformed from the voice samples in the plurality of direction intervals into the omnidirectional network to obtain voice features output by a complex linear transformation layer of the omnidirectional network,
inputting the voice features into the voice directional layer to obtain a voice feature corresponding to each direction interval, and
inputting the voice feature corresponding to each direction interval into a directional network corresponding to the each direction interval to obtain an initial sub-text of the directional network corresponding to the each direction interval; and
training the voice recognition model to obtain a trained voice recognition model, based on the initial text comprising the initial sub-text of the directional network corresponding to each direction interval.

8. The method according to claim 7, wherein the at least one recognition network further comprises a Fourier transform network
the inputting the voice samples into the to-be-trained voice recognition model to obtain the initial text output by at least one recognition network in the voice recognition model, comprises:
inputting the voice samples into the Fourier transform network to obtain the voice features transformed from the voice sample.

9. The method according to claim 7, wherein the training the voice recognition model to obtain the trained voice recognition model, based on the initial text comprising the initial sub-text of the directional network corresponding to each direction interval, comprises:
determining, for the initial sub-text corresponding to each directional network, a loss value of the initial sub-text corresponding to each directional network, and performing back propagation in the voice recognition model based on the loss value to update a parameter in the voice recognition model.

10. The method according to claim 9, wherein the voice recognition model further comprises a direction interval determination module;
the performing back propagation in the voice recognition model based on the loss value to update the parameter in the voice recognition model, comprises:
for each directional network, performing back propagation in the each directional network, by using the loss value obtained using the each directional network, to obtain a back propagation result;
combining back propagation results corresponding to the plurality of directional networks using the direction interval determination module, to obtain a propagation result set; and
performing back propagation in the omnidirectional network to update a parameter of the omnidirectional network and parameters of the plurality of directional networks, by using the combined propagation result set.

11. The method according to claim 8, wherein the voice recognition model further comprises a direction interval determination module;
the method further comprises:
obtaining a confidence of each initial sub-text output by each of the directional networks; and
the method further comprises:
determining a probability that the voice samples have a voice in each of the direction intervals corresponding to the plurality of directional networks respectively, using the direction interval determination module;
weighting the confidence of each initial sub-text output by the plurality of directional networks, by using the probability corresponding to each directional network as a weight of the confidence of the each initial sub-text output by the each directional network; and
determining a loss value of the voice recognition result using an initial sub-text corresponding to a largest weighting result as the voice recognition result, and performing back propagation in the voice recognition model using the loss value to update a parameter in the voice recognition model to obtain a trained voice recognition model.

12. A non-transitory computer readable storage medium, storing a computer program thereon, the program, when executed by a processor, implements the method according to claim 7.

13. An electronic device, comprising:
one or more processors; and
a storage device, for storing one or more programs,
wherein the one or more programs, when executed by the one or more processors, cause the one or more processors to perform operations comprising:
inputting a target voice into a pre-trained voice recognition model to obtain an initial text output by at least one recognition network in the voice recognition model, wherein the at least one recognition network comprises an omnidirectional network and a plurality of directional networks, each of the plurality of directional networks being obtained by training using a voice sample in a different direction interval, wherein inputting the target voice into the pre-trained voice recognition model to obtain the initial text output by the at least one recognition network in the voice recognition model comprises:
inputting a transformed voice obtained from the target voice into the omnidirectional network to obtain a given voice feature output by a complex linear transformation layer of the omnidirectional network, and inputting the given voice feature into each of the plurality of directional networks to obtain an initial sub-text output by each directional network, wherein each of the plurality of directional networks comprises a long short-term memory network layer and a streaming multi-layer truncated attention layer; and determining a voice recognition result of the target voice, based on the initial text comprising the initial sub-text output by each directional network.

14. The electronic device according to claim 13, wherein the at least one recognition network further 1 further comprises a Fourier transform network;

the inputting the target voice into the pre-trained voice recognition model to obtain the initial text output by the at least one recognition network in the voice recognition model, comprises:

inputting the target voice into the Fourier transform network, and performing Fourier transform on the target voice using the Fourier transform network to obtain the transformed voice.

15. The electronic device according to claim 13, wherein the voice recognition model further comprises a direction interval determination module;

after inputting the target voice into the pre-trained voice recognition model, the operations further comprise:

obtaining a confidence of each initial sub-text output by each of the directional networks; and the determining the voice recognition result of the target voice, based on the initial text comprising the initial sub-text output by each of the directional networks, comprises:

determining a probability that the target voice has a sub-voice in each of the direction intervals corresponding to the plurality of directional networks respectively, using the direction interval determination module;

weighting, for each initial sub-text, the confidence of the each initial sub-text output by the plurality of directional networks, by using the probability corresponding to each directional network as a weight of the confidence of the each initial sub-text output by the each directional network; and using an initial sub-text corresponding to a largest weighting result as the voice recognition result.

16. The electronic device according to claim 15, wherein the voice recognition model further comprises the Fourier transform network;

the inputting the target voice into the pre-trained voice recognition model to obtain the initial text output by the at least one recognition network in the voice recognition model, comprises:

inputting the target voice into the Fourier transform network, and performing Fourier transform on the target voice using the Fourier transform network to obtain the transformed voice; and the determining the probability that the target voice has the sub-voice in each of the direction intervals corresponding to the plurality of directional networks respectively, using the direction interval determination module, comprises:

inputting the processed voice feature into the direction interval determination module, and determining by the direction interval determination module the probability that the target voice has the sub-voice in each of the direction intervals corresponding to the plurality of directional networks respectively, using a preset direction determination technology;

wherein, the preset direction determination technology comprises an arrival direction estimation algorithm or a pre-trained deep neural network, and the deep neural network is configured to predict a direction interval of arrival of voice.

17. An electronic device, comprising:

one or more processors; and a storage device, for storing one or more programs, wherein the one or more programs, when executed by the one or more processors, cause the one or more processors to perform operations comprising:

acquiring a training sample, the training sample comprising voice samples in a plurality of direction intervals;

inputting the voice samples into a to-be-trained voice recognition model to obtain an initial text output by at least one recognition network in the voice recognition model, wherein the at least one recognition network comprises an omnidirectional network, a voice directional layer, and a plurality of directional networks, wherein each of the plurality of directional networks comprises a long short-term memory network layer and a streaming multi-layer truncated attention layer, wherein the inputting the voice samples into the to-be-trained voice recognition model to obtain the initial text output by at least one recognition network in the voice recognition model, comprises:

inputting voice features transformed from the voice samples in the plurality of direction intervals into the omnidirectional network to obtain voice features output by a complex linear transformation layer of the omnidirectional network, inputting the voice features into the voice directional layer to obtain a voice feature corresponding to each direction interval, and inputting the voice feature corresponding to each direction interval into a directional network corresponding to the each direction interval to obtain an initial sub-text of the directional network corresponding to the each direction interval; and training the voice recognition model to obtain a trained voice recognition model, based on the initial text comprising the initial sub-text of the directional network corresponding to each direction interval.

18. The electronic device according to claim 17, wherein the at least one recognition network further comprises a Fourier transform network;

the inputting the voice samples into the to-be-trained voice recognition model to obtain an initial text output by at least one recognition network in the voice recognition model, comprises:

inputting the voice samples into the Fourier transform network to obtain the voice features transformed from the voice sample.

19. The electronic device according to claim 17, wherein the training the voice recognition model to obtain the trained voice recognition model, based on the initial text comprising the initial sub-text of the directional network corresponding to each direction interval, comprises:

determining, for the initial sub-text corresponding to each directional network, a loss value of the initial sub-text corresponding to each directional network, and performing back propagation in the voice recognition model based on the loss value to update a parameter in the voice recognition model.

20. The electronic device according to claim 19, wherein the voice recognition model further comprises a direction interval determination module;

the performing back propagation in the voice recognition model based on the loss value to update the parameter in the voice recognition model, comprises:

for each directional network, performing back propagation in the each directional network, by using the loss value obtained using the each directional network, to obtain a back propagation result;

combining back propagation results corresponding to the plurality of directional networks using the direction interval determination module, to obtain a propagation result set; and performing back propagation in the omnidirectional network to update a parameter of the omnidirectional network and parameters of the plurality of directional networks, by using the combined propagation result set.

21. The electronic device according to claim 18, wherein the voice recognition model further comprises a direction interval determination module;

the method further comprises:

obtaining a confidence of each initial sub-text output by each of the directional networks; and the operations further comprise:

determining a probability that the voice samples have a voice in each of the direction intervals corresponding to the plurality of directional networks respectively, using the direction interval determination module;

weighting the confidence of each initial sub-text output by the plurality of directional networks, by using the probability corresponding to each directional network as a weight of the confidence of the each sub-initial text output by the each directional network; and determining a loss value of the voice recognition result using an initial sub-text corresponding to a largest weighting result as the voice recognition result, and performing back propagation in the voice recognition model using the loss value to update a parameter in the voice recognition model to obtain a trained voice recognition model.

\* \* \* \* \*